Sept. 7, 1937.　　　　E. ANTHONY　　　　2,091,951
COOKER STRUCTURE
Filed May 26, 1936　　　　2 Sheets-Sheet 1

Inventor
Eugene Anthony
By Charles L. Reynolds
Attorney

Sept. 7, 1937.  E. ANTHONY  2,091,951
COOKER STRUCTURE
Filed May 26, 1936  2 Sheets-Sheet 2

Inventor
Eugene Anthony
By Charles L. Reynolds
Attorney

Patented Sept. 7, 1937

2,091,951

UNITED STATES PATENT OFFICE 2,091,951

COOKER STRUCTURE

Eugene Anthony, Seattle, Wash., assignor to Paramount Heating & Mfg. Co., Seattle, Wash., a corporation of Washington Application May 26, 1936, Serial No. 81,830

23 Claims. (Cl. 219—19)

My invention relates to cookers, such as are usually heated by an electric heating element for the making of coffee or the cooking of light meals. Certain features of the invention, however, are of more general application, for example, to stands or tables, and while the claims refer to cookers, the more general application is intended, and they are to be read in the light of this specification.

It is a particular object of this invention to provide a cooker frame or the like of sheet metal in a form adapted for ready manufacture, and secured preferably by welding, yet in a form which will be attractive in appearance and extremely strong, though light.

A further object is to form such a cooker frame of sheet metal and from a blank so laid out as to employ to the greatest advantage all of the metal, yet to economize in metal by using substantially all of a rectangular blank, while keeping all parts of the frame within the rectangular outlines of the blank.

A further object, dealing more particularly with a corner construction for cooker frames or the like, is to provide such a corner construction which is attractive in appearance, neat, and yet thoroughly strong and rugged, though secured in an extremely simple manner at a few points of securement.

A further object is to provide a foot construction and a resilient and non-skid pad therefor which is of simple and inexpensive construction and easily attached, yet properly held in position against displacement.

With these and other objects in mind, as will appear hereafter, my invention comprises the novel parts, and the novel combination and arrangement thereof, all as shown in the accompanying drawings and as will be hereinafter described and more particularly pointed out in the claims which terminate this specification.

In the accompanying drawings I have shown my invention in the blank and in the assembled form, as now preferred by me.

Figure 1:
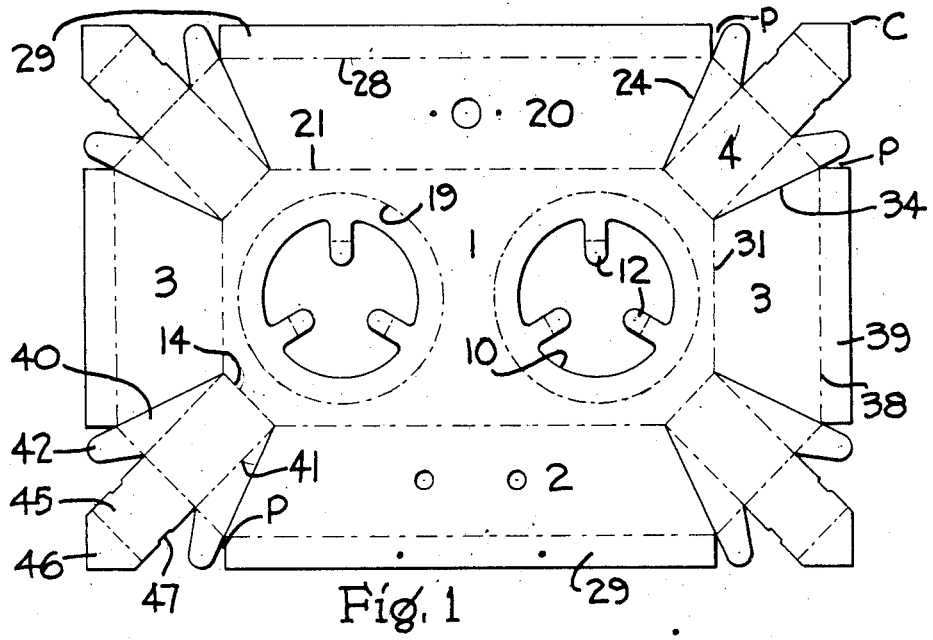
Figure 1 is a layout of the blank.

The finished cooker comprises a top 1, side walls 2 and 20, of which the first may be the front and the second the rear, and end walls 3. It is also provided with legs 4. The top may be suitably apertured, as indicated at 10, for the mounting of a brick 11 containing an electric resistance element, or for supporting a similar heater, and for the actual support of the brick it may be provided with fingers 12.

To form the corner structure, with integral braced legs which are a distinctive feature of this invention, the blank is slit, as indicated at 34 and 24, from points P, which are substantially equidistant from the corner C of the rectangular blank. The slits 24 and 34 extend angularly inward from the points P to a junction with the lines of fold 21 and 31, which define the edges of the top 1. If the side and end walls are to be perpendicular, the points P are preferably in prolongation of these lines of fold 21 and 31. If the walls are to be inclined, the points P should be located outwardly of the locations shown. Folding the blank along the lines 21 and 31 until the end walls 3 and the side walls 2 and 20 are substantially perpendicular, the lower edges of these walls come into contact, but they are left of trapezoidal shape.

Figure 4:
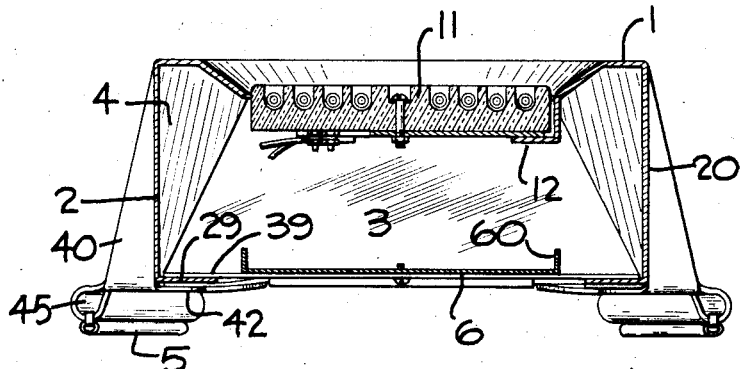
Figure 4 is a transverse section through the cooker on the line 4—4 of Figure 3.
Figure 5:
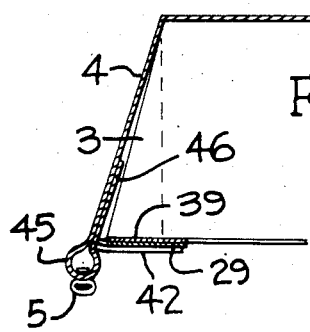
Figure 5 is a detail section through the corner construction, on the line 5—5 of Figure 3.

Flanges 29 and 39 are provided at the lower edge of each wall, outside of a rectangle including the several points P to be folded inwardly along the lines of fold 28 and 38, respectively. Inasmuch as the lower edges of the walls come into contact, when the flanges are folded inwardly these flanges will overlap, as may be seen in Figures 3, 4 and 5, and they may be secured by a spot weld, as indicated at 32. The edges of the flanges constitute the edges of the blank, and these flanges, with the leg structure and associated parts, to be described later, occupies substantially all of a rectangular blank, but does not extend beyond its margins as defined by the edges of the flanges.

Figure 3:
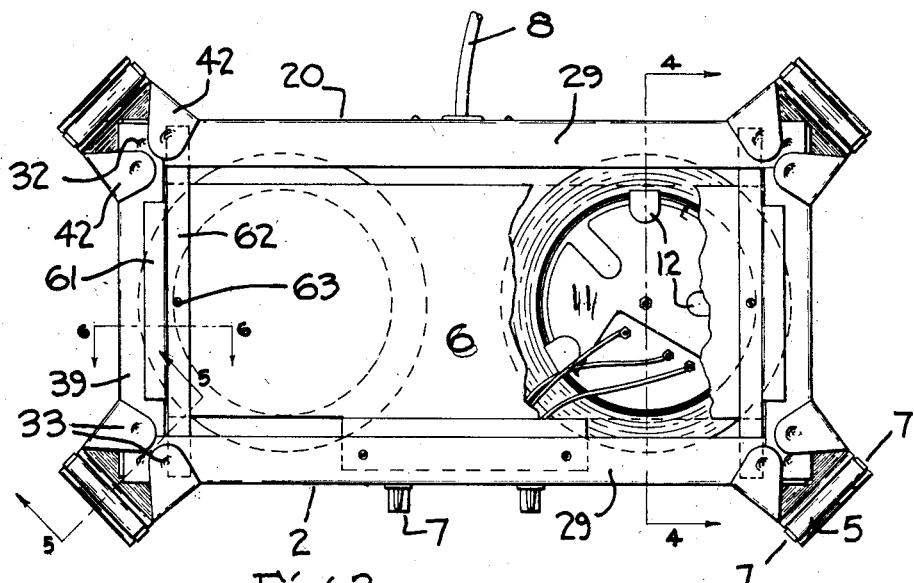
Figure 3 is a bottom plan view of the assembled cooker, with a part of the bottom pan broken away for clearer illustration.

The overlapping and welding, or equivalent securement at 32, stiffens the whole frame, but it is further stiffened by the corner structure. Each leg 4 is formed in the blank with side wings 40 to be folded inwardly along the line 41, so that the edges of these wings, which are defined by the respective slits 24 and 34, abut the adjoining side or end walls, and the inner face of the leg contacts with the meeting corners of the lower edges of the two walls. The securement of the edges of the wings 40 to the walls where they abut will further serve to stiffen the structure, and it may be even further stiffened by providing tabs 42 foldable inwardly from the lower edge of each wing to overlap the overlapped flanges 29 and 39, as is best seen in Figure 3. At this point they may be secured by spot welding, as indicated at 33 (Figure 3). A foot may be formed integrally with the leg 4, a portion 45 being left attached to the lower edge of the leg) but still within the rectangular margin of the blank) for this purpose. This portion 45 may be rolled in tubular form, and a tab 46, which extends out to the corner C of the blank, may be left attached and folded up against the inner face of the leg to be spot welded thereto, thus completing the foot and stiffening the structure further.

Figures 6, 7:
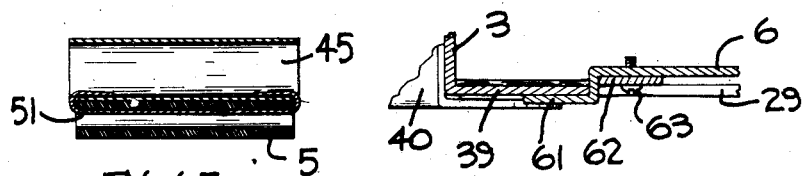
Figure 6 is a detail section through the bottom pan, showing the manner of supporting the same, taken on the line 6—6 of Figure 3.
Figure 7 is a vertical section through the foot, on the line 7—7 of Figure 3, illustrating the resilient pad and its manner of support.
Figure 2:
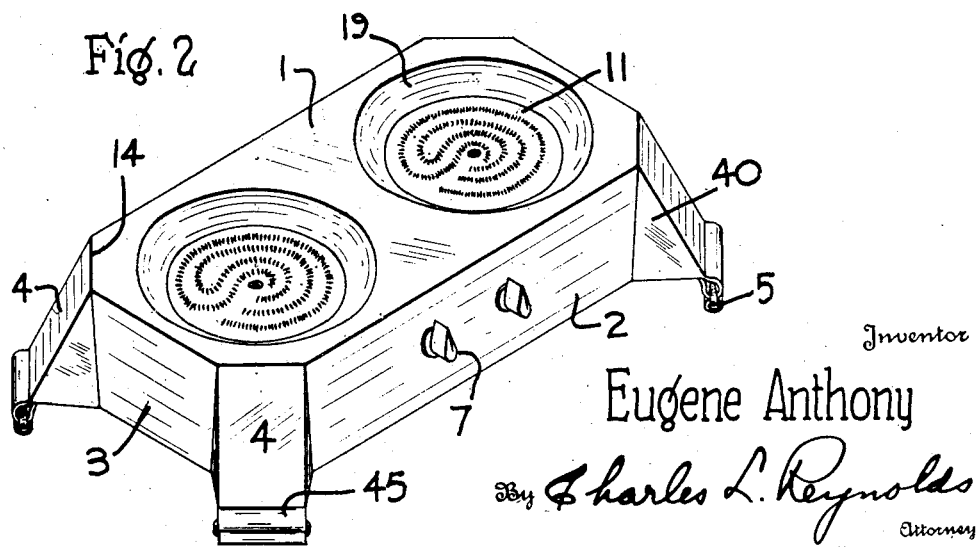
Figure 2 is a perspective view of the finished cooker.

A pad may be secured to the underside of the rolled foot, and is shown in detail in Figure 7. It may consist of a length of rubber tubing, indicated at 5, of substantially the length of the rolled foot 45, and a bendable strip 51 of metal or the like extends through the rubber tube 5, and is bent around inside the rolled foot 45. The ends of the foot, in that portion which is lowermost when set up, may be notched as indicated at 47 to receive the bent ends of the strip 51, thus preventing displacement of the strip and of the pad 5.

It will be apparent that so far as the general frame structure and the corner structure is concerned, the device might well be a stand or table, or might support something other than the electric element 11. In one form the device is shaped to receive a coffee maker, and its top may be dished, as indicated at 19, the better to support such a coffee maker.

To complete the cooker it is desirable to support a bottom pan beneath the wiring and the brick 11, and such a pan is shown at 6. Its dimensions are substantially the dimensions of the bottom opening inside the inner edges of the flanges 29 and 39. It may be suitably stiffened by upturned flanges 60, if desired. At opposite sides, for example the ends, it is provided with outwardly directed flanges 61 which engage beneath the flanges 39, thus holding the pan 6 at about the level of the flanges 39 and 29. It might be secured by joining these overlapped flanges 39 and 61, but as a ready means of securing it I prefer to employ one or usually two strips 62 which are of a length to underlie the pan 6 and to extend over the flanges 29. If these strips are placed abutting the flanges 39 or the break in the flanges 61, they cannot twist, and a single screw 63 passed through the strip 62 and threaded into the bottom of the pan 6 will hold the strip and pan in place, and it can be quickly secured, thus facilitating ready assembly.

Switches 7 and a lead-in wire 8 are provided, and apertures are formed for them in the walls as may be necessary. The entire cooker thus assembled is cheap, economical of material, readily blanked, formed and welded, and the parts assembled. It is of one-piece construction, the legs being integral. When set up it provides an attractive buttress-like corner structure with the legs inclined outwardly and downwardly from the angled corners 14 of the top. The corner structure, because of the securement of the edges of the wings to the walls, because of the meeting of the walls at their lower corners and the overlapping of their flanges, because of the engagement of the inner face of the leg with this corner, and because of the overlapping and securement of the tabs 52 to these flanges, is extremely strong; hence the frame may be made of comparatively light sheet metal, yet without danger of distortion or injury. Assembly is facilitated, and the entire cost is lessened, because of the simplicity and ease with which the frame is formed from the blank, and because legs do not have to be attached, as is usually the case.

What I claim as my invention is:

1. A cooker frame or the like comprising a sheet of metal defining a top of generally rectangular shape, with angled corners, side and end walls integral with and extending downwardly from the edges of said top, bottom flanges on each inwardly directed and overlapping at the corners, a leg integral with the top and extending downwardly from each angled corner, wings integral with each leg and extending inwardly from each side edge to contact the adjoining side and end walls, and tabs integral with and extending inwardly from the lower edge of each wing, on a level with said flanges, and of a length to overlap the latter, and said tabs and flanges being secured together to stiffen the structure.

2. A cooker frame or the like comprising a sheet of metal defining a top of generally rectangular shape, with angled corners, side and end walls integral with and extending downwardly from the edges of said top, a leg integral with and extending downwardly from each angled corner of the top, the side and end walls meeting and being secured together inside of each leg, and inwardly directed wings integral with each leg, the edges of said wings abutting, and being secured to, the adjoining side and end walls, at points spaced from the junction of such walls, to stiffen the structure.

3. A cooker frame or the like comprising a sheet of metal defining a top of generally rectangular shape, with angled corners, side and end walls integral therewith and extending downwardly from the edges of said top, the lower edge of each side and end wall being of a length in excess of the length of its upper edge, and substantially equal to the distance between the adjoining walls, whereby the ends of their lower edges meet when the walls are substantially perpendicular, and legs integral with the top and each extending downwardly from one of the angled corners of the top, and meeting the meeting ends of the lower edges of the side and end walls, to be held thereby in an inclined position.

4. A cooker frame or the like comprising a sheet of metal defining a top of generally rectangular shape, with angled corners, side and end walls integral therewith and extending downwardly from the edges of said top, the lower edge of each side and end wall being of a length in excess of the length of its upper edge, and substantially equal to the distance between the adjoining walls, whereby the ends of their lower edges meet when the walls are substantially perpendicular, legs integral with the top and each extending downwardly from one of the angled corners of the top, and meeting the meeting ends of the lower edges of the side and end walls, to be held thereby in an inclined position, and wings directed inwardly from the side edges of each leg, to meet the adjoining wall along lines spaced from the junction of the side and end walls, and to complete, with the leg, a buttress-like corner construction.

5. The combination of claim 3, wherein a flange projects inwardly from the lower edge of each side and end wall, the flanges overlapping and being secured together at the corners, and the leg is provided with securing means fixed to the flanges at the corners.

6. A cooker frame or the like comprising a sheet of metal defining a top of generally rectangular shape, with angled corners, side and end walls integral therewith and extending downwardly from the edges of said top, legs integrally joined to the top only along the respective angled corners, and each extending downwardly from its angled corner, the side and end walls and the leg being formed and disposed to interengage for mutual stiffening and support.

7. A cooker frame or the like comprising a sheet of metal defining a top, side and end walls extending downwardly from the top, a flat leg extending downwardly from the top at each corner, and inclined outwardly, and flat wings extending inwardly from each side edge of each leg, and abutting the adjoining side and end walls, and joined thereto, to stiffen the structure.

8. A corner structure for a cooker frame or the like which is formed with two substantially perpendicular walls joining at an angle, comprising a leg placed at an angle intermediate the angle of the two walls, and inclined outwardly and downwardly, and triangular wings on each side edge of said leg extending inwardly to abut said walls, and tabs formed on the lower edge of each wing, directed inwardly, and secured to the two walls, and means joining the walls together at the corner.

9. A corner structure for a cooker frame or the like which is formed with two substantially perpendicular walls joining at an angle, comprising a flat leg placed at an angle intermediate the angle of the two walls, and inclined outwardly and downwardly, triangular flat wings on each side edge of said leg extending inwardly to abut said walls, and being there secured, and a foot integral with the leg and formed as a cylindrical roll at its lower end.

10. A cooker frame or the like, blanked from a single rectangular sheet of metal, and when shaped comprising a top, side and end walls, angularly placed and outwardly and downwardly sloping legs at each corner, and a rolled foot on each leg, said blank being slit inwardly from two points equidistant from each corner and lying in prolongation of the edge folds of the top, to define a leg and side wings foldable inwardly from each side edge thereof to abut the walls, and each having an inwardly foldable tab at its lower edge, and further to define a rolled foot terminating in a tab adapted to lie flat against a face of the leg for securement thereto, each wall having at its lower edge an inwardly foldable flange of a length to overlap the flanges of adjoining walls at each corner, and the wing tabs being of a length to overlap such flanges, for securement.

11. In a cooker frame or the like, a corner structure including a sheet metal leg terminating in a rolled foot, a length of rubber tubing disposed beneath said foot, and a bendable strip of metal extending through the tubing and bent at each end into the end of the foot.

12. The combination of claim 11, wherein the foot is notched at each end, the bendable strip being received in said notch to prevent displacement of the tubing.

13. A cooker or the like comprising a frame formed with top, end and side walls, flanges inwardly directed from the lower edges of each wall to leave a bottom opening, a bottom pan of dimensions substantially equal to those of the bottom opening, flanges extending outwardly from two opposite edges of the bottom pan to engage beneath the flanges of the corresponding walls, a separate strip engageable beneath the bottom pan and above the flanges of the other walls, and quickly attachable means to secure said strip to the bottom pan.

14. A cooker or the like comprising a frame formed with top, end and side walls, flanges inwardly directed from the lower edges of each wall to leave a bottom opening, a bottom pan of dimensions substantially equal to those of the bottom opening, flanges extending outwardly from two opposite edges of the bottom pan to engage beneath the flanges of the corresponding walls, two separate strips engageable beneath the bottom pan, one at each end, and abutting the other pan flanges, and the ends of said strips engaging above the flanges of the other walls, and a bolt passing through each strip and threaded in the bottom pan to secure such strip in the position described.

15. A corner structure for a cooker frame or the like, in combination with a top and walls disposed at an angle to each other, comprising a leg extending downward from and integrally joined to the top only along a line of fold disposed transversely of the angle formed by the edges of the top, and two wings, one at each side of the leg, and integrally joined thereto along a line of fold defining the side edge of the leg, but otherwise disconnected from the frame, and directed inwardly therefrom to contact the walls, and being permanently secured thereto, to form a buttress-like corner structure.

16. A corner structure for a cooker frame or the like, in combination with a top and walls disposed at an angle to each other, comprising a leg extending downward from and integrally joined to the top only along a line of fold disposed transversely of the angle formed by the edges of the top, two wings, one at each side of the leg, and integrally joined thereto along a line of fold defining the side edge of the leg, but otherwise disconnected from the frame, and directed inwardly therefrom to contact the walls, and being permanently secured thereto, to form a buttress-like corner structure, and a tab joined to each wing along a line defining the lower edge of the wing, and extending inward to underlie the lower edge of the adjoining wall, and there being permanently secured, to stiffen the structure.

17. A corner structure for a cooker frame or the like, in combination with a top and walls disposed at an angle to each other, comprising a leg extending downward from and integrally joined to the top only along a line of fold disposed transversely of the angle formed by the edges of the top, two wings, one at each side of the leg, and integrally joined thereto along a line of fold defining the side edge of the leg, but otherwise disconnected from the frame, and directed inwardly therefrom to contact the walls, and being permanently secured thereto, to form a buttress-like corner structure, and a foot integrally joined to the leg along a line defining the lower edge of the leg, and formed to support the cooker frame from a suitable support.

18. A corner structure for a cooker frame or the like, in combination with a top and walls disposed at an angle to each other, the walls meeting at their lower edges, and having overlapping flanges permanently joined together, comprising a leg extending downward from and integrally joined to the top only along a line of fold disposed transversely of the angle formed by the edges of the top, two wings, one at each side of the leg, and integrally joined thereto along a line of fold defining the side edge of the leg, but otherwise disconnected from the frame, and directed inwardly therefrom to contact the walls, and being permanantly secured thereto, to form a buttress-like corner structure, and a tab joined to each wing along a line defining the lower edge of the wing, and extending inward to underlap the flange of the adjoining wall, and there being permanently secured.

19. A corner structure for a cooker frame or the like, in combination with two relatively angularly disposed walls of the cooker frame which meet at a point below their upper edge, and are there joined together for mutual support, such corner structure comprising a leg disposed at an angle intermediate the angle of the two walls, and inclined outwardly and downwardly, two triangular wings integrally joined to the leg along opposite side edges of the latter, and directed inwardly from such leg to dispose their free upright edge in abutting relationship to the respective walls, along lines spaced laterally from the point where the sides are joined together, and being permanently joined along such lines to the walls, to form a buttressed corner structure.

20. A sheet metal blank for a cooker frame or the like, which when shaped comprises a generally rectangular top with angled corners, downwardly folded side and end walls, and outwardly inclined legs folded downwardly from the angled corners, with integral wings folded inwardly from the side edges of each leg to abut the adjacent walls, said blank being generally rectangular, and slit at each corner inwardly from two points equidistant from the corner and lying in prolongation of the edge fold lines of the top, to corresponding ends of the angled corner of the top, to define the metal of the leg and wings, and being formed for folding along lines extending from the inner end of such slits outwardly to a point between the same slit's outer end and the corner, to define the leg and wings.

21. A sheet metal blank for a cooker frame or the like, which when shaped comprises a generally rectangular top with angled corners, downwardly folded side and end walls, outwardly inclined legs folded downwardly from the angled corners with integral wings folded inwardly from the side edges of each leg to abut the adjacent walls and with a foot formed from the end of the leg metal, said blank being generally rectangular, and slit at each corner inwardly from two points equidistant from the corner and lying in prolongation of the edge fold lines of the top, to corresponding ends of the angled corner of the top, to define between the two slits at each corner the metal of a corner structure, and to define between slits at adjacent corners the metal of the walls, the metal of each corner structure being notched between the corner and each slit, inwardly to the lower end of the leg, to define wings inwardly foldable along a line from the apex of the notch to the inner end of the adjoining slit, and the foot bendable along a line joining the apices of the two notches, and the leg bounded by such lines and by the angled corner of the top.

22. A sheet metal blank for a cooker frame or the like, which when folded comprises a top, walls disposed at an angle to each other, and legs extending outwardly and downwardly at an angle intermediate that of the walls, said blank being of the general shape of the top, with a plurality of corners, and including the top, and walls joined along lines of fold defining the edges of the top, and including also corner structures, each including a leg joined to the top along a line of fold disposed at an angle intermediate the two edges of the top defining such corner, the blank being slit inwardly from two points in its edge, at opposite sides of a corner, to the corresponding end of the line of fold of the leg, and being foldable along a line extending from the inner end of each slit to a point in its edge lying between the outer end of such slit and the corner, to define the leg and inwardly foldable side wings integral with the leg.

23. A sheet metal blank for a cooker frame or the like, which when shaped comprises a generally rectangular top with angled corners, downwardly folded side and end walls, with inwardly folded flanges at their lower edges overlapping at their ends, outwardly inclined legs folded downwardly from the angled corners with integral wings folded inwardly from the side edges of each wing to abut the adjacent wall, and the wings having inwardly folded overlapping tabs at their lower edges, said blank being generally rectangular, including the top and walls joined along lines of fold defining the edges of the top, and the flanges joined to their respective walls along lines of fold spaced equally from the first lines of fold and defining the lower edges of the walls, said blank also including the metal of corner structures each defined by two slits extending from points in the edge of the blank and lying substantially in prolongation of the edge fold lines of the top, inwardly to the corresponding ends of the edge fold lines defining the angled corners, the metal of each corner structure being notched inwardly intermediate the outer end of each slit and the corner of the blank, to a point which defines a lower corner of the leg, thus to define tabs foldable along a line inclined outwardly from the apices of such notches, and of a length, when the frame is shaped, to overlie the ends of the flanges, while the slit edges of the corner structure abut the adjacent walls, to form a buttressed leg.

EUGENE ANTHONY.